(12) United States Patent
Johnson et al.

(10) Patent No.: US 8,463,920 B2
(45) Date of Patent: Jun. 11, 2013

(54) SHARING IP NETWORK RESOURCES

(75) Inventors: Jeremy T. Johnson, Foster City, CA (US); Milo S. Medin, Sunnyvale, CA (US)

(73) Assignee: At Home Bondholders' Liquidating Trust, New York, NY (US)

( * ) Notice: Subject to any disclaimer, the term of this patent is extended or adjusted under 35 U.S.C. 154(b) by 1114 days.

(21) Appl. No.: 11/261,809

(22) Filed: Oct. 28, 2005

(65) Prior Publication Data

US 2006/0041682 A1    Feb. 23, 2006

Related U.S. Application Data

(62) Division of application No. 09/645,011, filed on Aug. 23, 2000, now Pat. No. 6,985,963.

(51) Int. Cl.
*G06F 15/177* (2006.01)

(52) U.S. Cl.
USPC ............................ 709/229; 709/226; 718/105

(58) Field of Classification Search
USPC .................. 709/226, 229; 718/102, 104, 105
See application file for complete search history.

(56) References Cited

U.S. PATENT DOCUMENTS

| 3,789,137 A | 1/1974 | Newell |
| 4,173,014 A | 10/1979 | Leighou et al. |

(Continued)

FOREIGN PATENT DOCUMENTS

| EP | 0 748 095 A2 | 12/1996 |
| EP | 0 828 208 A2 | 3/1998 |
| WO | WO 98/44404 A1 | 10/1998 |

OTHER PUBLICATIONS

Anderson, L., et al., "LDP Specification," Network Working Group Internet Draft, Oct. 1999. 124 pages, [online] [Retrieved on Nov. 21, 2000]. Retrieved from the Internet: <URL:http//www.ieft.org/internet-drafts/draft-ietf-mpls-ldp-06.txt>.

(Continued)

*Primary Examiner* — Kenneth R Coulter
(74) *Attorney, Agent, or Firm* — Fenwick & West LLP (57) ABSTRACT

A system and method for sharing access to an internet protocol (IP) network among multiple internet service providers (ISPs) uses multiprotocol label switching (MPLS). End-users are coupled to a broadband customer access network. Each end-user is also associated with at least one of the ISPs. An aggregation router interfaces the customer access network with a network backbone. The network backbone includes a border router for interfacing between the network backbone and the network of an ISP. When the border router is activated, it creates a forwarding equivalency class (FEC) corresponding to the ISP. The border router stores a label for the FEC and the interface for reaching the ISP in an FEC table. The border router advertises the label binding for the FEC to all upstream nodes. An intermediate node receiving the label binding creates its own FEC table, associates a new label with the FEC, and advertises the new label binding to its upstream nodes. The aggregation router receives and builds a FEC table containing the label bindings for all ISPs reachable over the network backbone. When the aggregation router receives a data packet from an end-user, the aggregation router determines the ISP associated with the end-user, labels the data packet with the label corresponding to the FEC for that ISP, and routes the packet on the network backbone. The packet eventually reaches the border router, which pops off the label and passes the packet to the ISP.

21 Claims, 5 Drawing Sheets

U.S. PATENT DOCUMENTS

| | | |
|---|---|---|
| 4,429,332 A | 1/1984 | Pargee, Jr. |
| 4,538,176 A | 8/1985 | Nakajima et al. |
| 4,814,883 A | 3/1989 | Perine et al. |
| 5,093,718 A | 3/1992 | Hoarty et al. |
| 5,335,346 A | 8/1994 | Fabbio |
| 5,394,182 A | 2/1995 | Klappert et al. |
| 5,446,490 A | 8/1995 | Blahut et al. |
| 5,511,208 A | 4/1996 | Boyles et al. |
| 5,512,935 A | 4/1996 | Majet et al. |
| 5,519,698 A | 5/1996 | Lyles et al. |
| 5,532,735 A | 7/1996 | Blahut et al. |
| 5,539,449 A | 7/1996 | Blahut et al. |
| 5,550,577 A | 8/1996 | Verbiest et al. |
| 5,550,578 A | 8/1996 | Hoarty et al. |
| 5,586,260 A | 12/1996 | Hu |
| 5,608,446 A | 3/1997 | Carr et al. |
| 5,649,099 A | 7/1997 | Theimer et al. |
| 5,682,195 A | 10/1997 | Hendricks et al. |
| 5,701,464 A | 12/1997 | Aucsmith |
| 5,727,159 A | 3/1998 | Kikinis |
| 5,734,719 A | 3/1998 | Tsevdos et al. |
| 5,745,837 A | 4/1998 | Fuhrmann |
| 5,761,606 A | 6/1998 | Wolzien |
| 5,768,528 A | 6/1998 | Stumm |
| 5,787,470 A | 7/1998 | DeSimone et al. |
| 5,787,483 A | 7/1998 | Jam et al. |
| 5,790,541 A | 8/1998 | Patrick et al. |
| 5,790,806 A | 8/1998 | Koperda |
| 5,793,980 A | 8/1998 | Glaser et al. |
| 5,802,292 A | 9/1998 | Mogul |
| 5,815,574 A | 9/1998 | Fortinsky |
| 5,835,087 A | 11/1998 | Herz et al. |
| 5,838,927 A | 11/1998 | Gillon et al. |
| 5,847,751 A | 12/1998 | Safadi |
| 5,850,218 A | 12/1998 | LaJoie et al. |
| 5,852,713 A | 12/1998 | Shannon |
| 5,864,852 A | 1/1999 | Luotonen |
| 5,883,901 A | 3/1999 | Chiu et al. |
| 5,892,535 A | 4/1999 | Allen et al. |
| 5,898,456 A | 4/1999 | Wahl |
| 5,905,872 A | 5/1999 | DeSimone et al. |
| 5,913,025 A | 6/1999 | Higley et al. |
| 5,917,822 A | 6/1999 | Lyles et al. |
| 5,918,013 A | 6/1999 | Mighdoll et al. |
| 5,935,207 A | 8/1999 | Logue et al. |
| 5,940,074 A | 8/1999 | Britt, Jr. et al. |
| 5,941,947 A | 8/1999 | Brown et al. |
| 5,950,195 A | 9/1999 | Stockwell et al. |
| 5,956,716 A | 9/1999 | Kenner et al. |
| 5,961,593 A | 10/1999 | Gabber et al. |
| 5,964,891 A | 10/1999 | Caswell et al. |
| 5,991,306 A | 11/1999 | Burns et al. |
| 6,003,030 A | 12/1999 | Kenner et al. |
| 6,003,776 A | 12/1999 | Drupsteen |
| 6,038,319 A | 3/2000 | Chari |
| 6,049,877 A | 4/2000 | White |
| 6,101,180 A | 8/2000 | Donahue et al. |
| 6,101,535 A | 8/2000 | Hussmann et al. |
| 6,101,607 A | 8/2000 | Bachand et al. |
| 6,119,945 A | 9/2000 | Muller et al. |
| 6,134,551 A | 10/2000 | Aucsmith |
| 6,138,141 A | 10/2000 | DeSimone et al. |
| 6,161,139 A | 12/2000 | Win et al. |
| 6,182,142 B1 | 1/2001 | Win et al. |
| 6,192,051 B1 | 2/2001 | Lipman et al. |
| 6,192,349 B1 | 2/2001 | Husemann et al. |
| 6,201,536 B1 | 3/2001 | Hendricks et al. |
| 6,205,488 B1 | 3/2001 | Casey et al. |
| 6,216,227 B1 | 4/2001 | Goldstein et al. |
| 6,260,027 B1 | 7/2001 | Takahashi et al. |
| 6,289,458 B1 | 9/2001 | Garg et al. |
| 6,298,482 B1 | 10/2001 | Seidman et al. |
| 6,311,207 B1 | 10/2001 | Mighdoll et al. |
| 6,321,337 B1 | 11/2001 | Reshef et al. |
| 6,330,614 B1 | 12/2001 | Aggarwal et al. |
| 6,343,324 B1 | 1/2002 | Hubis et al. |
| 6,351,812 B1 | 2/2002 | Datar et al. |
| 6,477,166 B1 | 11/2002 | Sanzi et al. |
| 6,493,876 B1 | 12/2002 | DeFreese et al. |
| 6,505,300 B2 | 1/2003 | Chan et al. |
| 6,515,598 B2 | 2/2003 | Parenteau et al. |
| 6,538,991 B1 | 3/2003 | Kodialam et al. |
| 6,553,178 B2 | 4/2003 | Abecassis |
| 6,556,544 B1 | 4/2003 | Lee |
| 6,578,079 B1 | 6/2003 | Gittins |
| 6,584,071 B1 | 6/2003 | Kodialam et al. |
| 6,603,758 B1 * | 8/2003 | Schmuelling et al. ........ 370/352 |
| 6,611,532 B1 | 8/2003 | Madour et al. |
| 6,678,733 B1 | 1/2004 | Brown et al. |
| 6,680,943 B1 | 1/2004 | Gibson et al. |
| 6,693,878 B1 * | 2/2004 | Daruwalla et al. ............ 370/235 |
| 6,718,359 B2 * | 4/2004 | Zisapel et al. ................ 718/105 |
| 6,728,777 B1 | 4/2004 | Lee et al. |
| 6,728,782 B1 | 4/2004 | D'Souza et al. |
| 6,732,179 B1 | 5/2004 | Brown et al. |
| 6,738,978 B1 | 5/2004 | Hendricks et al. |
| 6,772,433 B1 | 8/2004 | LaJoie et al. |
| 7,027,448 B2 * | 4/2006 | Feldmann et al. ............ 370/401 |
| 7,065,578 B2 * | 6/2006 | Garrett et al. ................ 709/229 |
| 7,095,740 B1 * | 8/2006 | Jagannath et al. ............ 370/392 |
| 7,225,275 B2 | 5/2007 | Medin |
| 7,406,530 B2 | 7/2008 | Brown et al. |
| 7,430,531 B1 * | 9/2008 | Snyder ............................ 705/35 |
| 7,444,669 B1 * | 10/2008 | Bahl et al. ......................... 726/3 |
| 7,529,856 B2 | 5/2009 | Medin |
| 2002/0013844 A1 * | 1/2002 | Garrett et al. ................. 709/225 |
| 2002/0023160 A1 * | 2/2002 | Garrett et al. ................. 709/229 |
| 2002/0071389 A1 | 6/2002 | Seo |
| 2003/0103510 A1 | 6/2003 | Svanberg et al. |
| 2003/0195984 A1 * | 10/2003 | Zisapel et al. ................ 709/238 |
| 2004/0205339 A1 | 10/2004 | Medin |
| 2004/0210633 A1 | 10/2004 | Brown et al. |
| 2007/0183441 A1 | 8/2007 | Medin |

OTHER PUBLICATIONS

Armitage, G., "MPLS: The Magic Behind the Myths," IEEE Communications Magazine, Jan. 2000, pp. 124-131, IEEE.

Aukia, P., et al., "Rates: A Server for MPLS Traffic Engineering," IEEE Network Magazine, Mar./Apr. 2000, pp. 34-41.

Callon, R., et al., "A Framework for Multiprotocol Label Switching," Network Working Group Internet Draft, Sep. 1999, 64 pages, [online] [Retrieved on Nov. 21, 2000] Retrieved from the Internet: <URL:http://www.ietf.org/Internet-drafts/draft-ietf-mpls-framework-05.txt>.

Gunter, M., "Virtual Private Networks Over the Internet," citeseer.com document, Aug. 1998, pp. 1-7.

Kodialam, M., et al., "Minimum Interference Routing with Applications to MPLS Traffic Engineering," INFOCOM 2000, Mar. 2000, pp. 884-893.

Mortier, R., et al., "Switchlets and Resource-Assured MPLS Networks," Cambridge University Computer Laboratory, May 2000, pp. 1-17.

Rosen, E. C., et al., "Multiprotocol Label Switching Architecture," Network Working Group Internet Draft, Aug. 1999, 62 pages, [online] [Retrieved on Nov. 21, 2000] Retrieved from the Internet: <URL: http://www.ieft.org/internet-drafts/draft-ietf-mpls-arch-06.txt>.

Semeria, C., "Traffic Engineering for the New Public Network," White Paper, Juniper Networks, Inc., Sep. 2000, 23 pages.

X. Xiao, A. Hannan, B. Bailey, and L. Ni, "Traffic engineering with MPLS in the Internet," IEEE Network Magazine, Mar. 2000.

@Home Frequently Asked Questions, became aware of reference on Jul. 13, 2003.

"@Home and Netscape Announce Strategic Relationship to Define Cable-Based Internet Services to the Home," Network Press Release 1995, pp. 1-3.

"Automotive Industry Will Seek Internet Service Provider Certification," The Cook Report on Internet, vol. IV, No. 11, Feb. 1996, pp. 1-24.

"Cable Modems and the Future of Broadband," High-Speed Networking Newsletter, Section: No. 10, vol. 4, Jan. 1, 1996, pp. 1-2.

"Defendant AT&T Corp.'s Preliminary Invalidity Contentions," Case No. C 02 5442 SI, United States District Court of Northern California, San Francisco Division, Richard A. Williamson, on behalf of and as trustee for the Bondholders' Liquidating Trust of At Home Corporation, and on behalf of and in the name of At Home Liquidating Trust of *At Home Corporation* vs. *AT&T Corporation*, Jul. 31, 2003, 580 pages.

"Macromedia and @Home Demonstrate High Bandwidth Multimedia on The Web; Companies Announce Cooperation on Tools and Technology," PR Newswire, Nov. 29, 1995, pp. 1-3.

"Multicasting in an ATM Network," ntrg.cs.tcd.ie/undergrad/4ba2/multicast/leon/retrieved from the Internet Aug. 22, 2005.

"Router and Switch Request for Proposal," @Home Engineering (DVE &DSM), Dec. 20, 1995.

"Skyconnect to Market Digital's Mediaplex ad Insertion Systems With Comprehensive ad Fulfillment Service," PR Newswire, Dec. 19, 1995, pp. 1-2.

"The Future of the Internet," The Cook Report on Internet, Jan. 11-12, 1996, pp. 1-4.

Abrams, M. et al., "Caching Proxies: Limitations and Potentials," 4th International World Wide Web Conference, Boston, USA, Oct. 7, 1975, pp. 119-133.

Allen, J. et al. "VCTV: A Video-On-Demand Market Test," AT&T Technical Journal, Jan./Feb. 1993, pp. 7-14.

Almeroth, K. C. et al., "On the Performance of a Multicast Delivery Video-On-Demand Service with Discontinuous VCR Actions," Sep. 7, 1994.

Almeroth, K.C. et al., "The Role of Multicast Communication in the Provision of Scalable and Interactive Video-On-Demand Service," IEEE Journal on Selected Areas in Communications, 14(6), Aug. 1996, 1110-1122.

Amir, E. et al., "An Application Level Video Gateway," ACM Multimedia Conf., San Francisco, CA, Nov. 1995, pp. 255-265.

Amir, Y. et al., "Robust and Efficient Replication Using Group Communication," Technical Report CS94-20, The Hebrew University of Jerusalem, Nov. 1994, pp. 1-18.

Baentsch et al., Introducing Application-Level Replication and Naming into today's Eb, Fifth International WWW Conference, May 1996.

Barber, S., "Data Over Cable and the @Home Network," @Home Network, Feb. 1996, [Retrieved from the Internet], pp. 1-4.

Berwick, Robert C. et al., "Research Priorities for the World-Wide Web," Report of the NSF Workshop Sponsored by the Information, Robotics, and Intelligent Systems Division, Arlington, VA, Oct. 31, 1994, pp. 1-43.

Bestavros, A., "Demand-based Data Dissemination in Distributed Multimedia Systems," In Proceedings of ACM/IASTED/ISMM Conference on Distributed Multimedia Systems and Applications, Stanford, CA, 1995, 4 pages.

Blahut, T. et al., "The AT&T Interactive Consumer Video Services Platform," 1.sup.st International Workshop on Community Networking Multiple, Jul. 13-14, 1994, pp. 1-10.

Blank, Christine, "The FSN Challenge: Large-Scale Interactive Television," IEEE Computer Society, May 1995, pp. 9-13.

Bourne, J. et al. "Implementing the Information Highway," Telesis, Section: vol. 29, No. 6, May 1994, pp. 4-25.

Bowman, C. Mic et al., "Harvest: A Scalable, Customizable Discovery and Access System," Technical Report CU-CS-732-94, Department of Computer Science, University of Colorado, Boulder, Aug. 4, 1994, pp. 1-27.

Bowman, C. Mic et al., "Scalable Internet Resource Discovery: Research Problems and Approaches," Communications of the ACM, vol. 37, No. 2, Aug. 1994, pp. 98-114.

Bowman, C. Mic et al., "The Harvest Information Discovery and Access System," Computer Networks and ISDN Systems, 28(1-2), Dec. 1995, pp. 119-125.

Carhart, T.W., "Cable Modem Mania is Beginning to Build—Deploying a Broadband Data Service," Communication Engineering and Design, Mar. 1996, pp. 1-6.

Casner, S., "Frequently Asked Questions (FAQ) on the Multicast Backbone (MBONE)," May 1993, [Retrieved from the Internet] Retrieved on Aug. 1, 2003, pp. 1-11.

Chankhunthod, A. et al., "A Hierarchical Internet Object Cache," Proceedings of the USENIX 1996 Annual Technical Conference, San Diego, CA—Jan. 1996, pp. 153-163.

Chapple, Paul. "Rethinking the role of an embedded Internet client in digital set-top boxes", submitted for the World Wide Web Consortium workshop, "Television and the Web", Jun. 29-30, 1998, Sophia-Antipolis, France.

Chueng, Shun Yan et al., "On the Use of Destination Set Grouping to Improve Fairness in Multicast Video Distribution," Tech Report GIT-CC-95-25, Jul. 18, 1995, pp. 1-22.

Clark, R. et a., "Providing Scalable Web Services Using Multicast Communication," IEEE Workshop on Services in Distributed and Networked Environments—Jun. 1995, pp. 1-27.

Dail, J. et al., "Adaptive Digital Access Protocol: A MAC Protocol for Multiservice Broadband Access Networks," IEEE Communications, vol. 34, No. 3, Mar. 1996, pp. 104-112.

Danzig, P. et al., "A Case for Caching File Objects Inside Internetworks," Technical Report CU-CS-642-93—Department of Computer Science, University of Colorado, Boulder, CO, 1993, pp. 1-15.

Danzig, P. et al., "Massively Replicating Services in Wide-Area Internetworks," Technical Report, Computer Science Department, University of Southern California, 1994, pp. 1-13.

Declaration of Milo S. Medin, entered Aug. 24, 2011.

De Zhong, W. et al., "A Copy Network With Shared Buffers for Large-Scale Multicast ATM Switching," IEEE/ACM Transactions on Networking, vol. 1, No. 2, Apr. 1993, pp. 157-165.

DevEdge, Online, Archive Documentation Spring 1996—Dec. 1997, [Retrieved from the Internet] Retrieved on Aug. 1, 2003; pp. 1-3.

Doar, J.M.S., "Multicast in the Asynchronous Transfer Mode Environment," Ph. D. Thesis. University of Cambridge, Jan. 1993, pp. i-xvi and 1-168.

Donnelley, J. "WWW Media Distribution Via Hopwise Reliable Multicast," In Electronic Proceedings of the 3.sup.rd International World Wide Web Conference, Darmstadt, Germany, Apr. 10-13, 1995, pp. 1-13.

Duberman, D., Daily Spectrum: Interactive Media & Online Developer News, Jan. 23, 1996, pp. 1-7.

Dubey, S. et al., "A Movie-Scheduling Policy for Video-On-Demand Systems," Computer Science Department, University of Central Florida; Computer Technology Institute, Patras, Greece, became aware of reference on Jul. 13, 2003.

Ellis, Caron Schwartz "Cable Modem Speeds Accented At Calif. Show," Boulder County Business Report, 1996, 3 pages.

Federighi, Craig et al., "A Distributed Hierarchical Storage Manager for a Video-On-Demand System," Computer Science Division—EECS, University of California, Berkeley, 1994, pp. 1-11.

Floyd, Sally et al. "A Reliable Multicast Framework for Light-weight Sessions and Application Level Framing," Proceedings of SIGCOMM '95, Cambridge, MA, 1995, pp. 1-24.

Gilder, G., "ISDN vs. Cable Modems," Jan. 26, 1996, p. 1.

Glider, G., "Telecom: Goliath at Bay," Forbes, Feb. 1996, pp. 100-117.

Gillett, Sharon, "Connecting Homes to the Internet: An Engineering Cost Model of Cable vs. ISDN," Laboratory for Computer Science, Massachusettes Institute of Technology, Technical Report 654, 1995, pp. 1-197.

Golding, R. A. "A Weak-Consistency Architecture for Distributed Information Services," Computing Systems, 5(4) (UCSC-CRL-92-31), 1992, pp. 1-16.

Golding, R. A. "Modeling Replica Divergence in a Weak-Consistency Protocol for Global-Scale Distributed Data Bases," Technical Report UCSC-CRL-93-09, UC Santa Cruz, Feb. 1993, pp. 1-15.

Golding ,R. A., "Weak-Consistency Group Communication and Membership," Technical Report UCSC-CRL-92-52, Ph.D. thesis, UC Santa Cruz, Dec. 1992, pp. i-viii and 1-154.

Gove, A., "@Home With Will Hearst," Red Herring Magazine, Nov. 1995, pp. 1-5.

Gwertzman, J. "Autonomous Replication in Wide-Area Internetworks," Technical Report TR-17-95, Center for Research on Computing Technology, Harvard University, Cambridge, MA, Apr. 1995, pp. 1-100.

Gwertzman, J. and et al, "The Case for Geographical Push-Caching" Proceedings of the Fifth Workshop on Hot Topics in Operating Systems (HotOS-V) HOTOS95, May 1995, pp. 51-55.

Gwertzman, J. et al., "World-Wide Web Cache Consistency," In Proceedings of USENIX Symposium on Internetworking Technologies and Systems, 1996, pp. 141-152.

Haar, S.V., "Time Warner to Offer High-Speed Net Access," Newsbytes, Dec. 7, 1995, pp. 1-2.

Hamilton, M. "Multicast Approaches to World-Wide Web Caching," Technical Report LUT CS-TR 988, Department of Computer Studies, Loughborough University of Technology, United Kingdom, Aug. 1995, pp. 1-19.

Hanawa, T. et al., "MINC: Multistage Interconnection Network With Cache Control Mechanism," Parallel and Distributed Computing Systems (PDCS)'96, Sep. 1996, pp. 310-317.

Hardy, D. et al., "Effective Use of Internet Information", Harvest User's Manual, Technical Report CU-CS-743-94, Version 1.3, University of Colorado at Boulder, Sep. 7, 1995, pp. i-v and 1-87.

Hearst III, W., Netscape Developer Conference, Keynote Address, Mar. 7, 1996, pp. 1-12.

Holbrook, H. et al., "Log-Based Receiver-Reliable Multicast for Distributed Interactive Simulation," Proc. ACM Sigcomm95, pp. 342-356, Boston, MA, Aug. 1995.

Internet Engineering Task Force. Requirements for Internet Hosts—Communication Layers, Request for Comments: 1122 [online], [retrieved on Jun. 22, 2001]. 107 pages.

Jacobson, V., "How to Kill the Internet," SIGCOMM'95 Middleware Workshop, Cambridge, MA, Aug. 28, 1995, pp. 1-13.

Jadav, D. et al. "Design Issues in High Performance Media-On Demand Servers," Case Center Technical Report #9503, Case Center at Syracuse University, Feb. 1995, pp. 1-18.

Jeffery, C. et al., "Proxy-Sharing Proxy Servers," IEEE ETA-COM Conf., Portland, Oregon, May 1996, pp. 1-4.

Johnson, T. et al., "Two Approaches for High Concurrency in Multicast-Based Object Replication," Technical Report 94-041, Department of Computer and Information Sciences, University of Florida, 1994, pp. 1-58.

Jupiter Media Metrix, Press Release Mar. 1, 1999. Jupiter: Web Ventures Are Woefully Unprepared for Set-Top.

Kalva, H. et al., "Techniques for Improving the Capacity of Video-On Demand Systems," 29.sup.th Hawaii International Conference on System Sciences (HICSS), vol. 2: Decision Support and Knowledge-Based Systems, Maui, Hawaii, Jan. 3-6, 1996, 8 pages.

Kelly, Mary Sydney, "Cable Niche Makes SkyConnect A Contender," Boulder County Business Report, Jun. 1997, 2 pages.

Klemets, Anders, "The Design and Implementation of a Media on Demand System for WWW," In Proc. 1.sup.st International Conference on the WorldWide Web, Geneva, Switzerland, 1994, 9 pages.

Knight, G. et al., "A Data Telecommunications Gateway Between the Internet and ISDN," Data and Telecom. ISDN Gateway, INET'95, 1995, 10 pages.

Korkea-Aho, M., "Scalability in Distributed Multimedia Systems," Master's Thesis, Helsinki University of Technology, Laboratory of Information Processsing Science, Nov. 5, 1995, pp. 1-95.

Lai, Y.C. et al., "A Hierarchical Network Storage Architecture for Video-On-Demand Services," Proceedings of IEEE 21.sup.st Conference on Local Computer Networks, Oct. 1996, 9 pages.

Lee, Y.B. et al., "VIOLA: Video on Local-Area-Networks," In Proc. 2.sup.nd ISMM/IASTED Int. Conf. Multimedia Systems and Applications, Stanford University, Stanford, CA, Aug. 1995, pp. 1-16.

Lemberg, H., IETF 1995 Archives, Broadband '96 IEEE Workshop, Tucson, AZ, Jan. 2, 1996-Jan. 5, 1996, NETSYS.COM, Dec. 21, 1995, pp. 1-8.

Little, T.D.C. et al., "Prospects for Interactive Video-on-Demand," Multimedia Communications Laboratory—Department of Electrical, Computer and Systems Engineering—Boston University, Boston, MA 02215—In IEEE Multimedia, vol. 1, No. 3, Fall 1994, pp. 14-24.

Lopez-Ortiz et al., "A Multicollaborative Push-Caching HTTP Protocol for the WWW," In Proceedings of the Fifth International World Wide Web Conference—Paris, France, May 1996 (also available as Technical Report CS-96-12, Dept. of Computer Science, University of Waterloo), pp. 13.

Luo, W. et al., "The Effect of Multicasting and Multiple Media Object Types on Parallel and Merging Storage Strategies," Georgia Institute of Technology, CC Technical Report, GIT-CC-95-24, 1995, pp. 1-20.

Luotonen, A. et al., "World-Wide Web Proxies," Computer Networks and ISDN Systems, vol. 27, No. 2, Apr. 1994, pp. 147-154.

Malpani, R. et al., "Making World Wide Web Caching Servers Cooperate," 4th International WWW Conference, Boston, MA, 1995, pp. 1-12.

Maxemchuk, N. et al., "Voice and Data on a CATV Network," IEEE Journal on Selected Areas in Communications, vol. SAC-3, No. 2, Mar. 1985, pp. 300-311.

McDonnell, Patrick, "AT&T Breaks Speed Barrier," Computers & Electronics, vol. 22, No. 9, Sep. 1984, 6 pages.

McManus N. et al., "Cable Plunges Into The Internet"; Digital Media, Dec. 18, 1995, pp. 1-7.

MCNS Holdings, L.P. "Cable Modem Termination System—Network Side Interface Specification", Data Over Cable Interface Specifications, SP-CTMS-NSII01-960702, 17 pages, entered Aug. 24, 2011.

Medin, Milo, "Transforming The Net With Broadband Cable Data," Smart Valley Talk, Feb. 1996, pp. 1-3.

Miller, S. P. et al., "Kerberos Authentication and Authentication and Authorization System," Oct. 27, 1988 Project Athena Technical Plan, Published by Mass Inst. of Technology, 36 pages.

Muntz, D. et al., "Multi-Level Caching in Distributed File Systems or Your Cache Ain't Nuthin' But Trash," in Proceedings of the 1992 Winter USENIX Conference, 1992, pp. 305-313.

Muntz, D. et al., "Multi-Level Caching in Distributed File," CITI Technical Report 91-3, University of Michigan, Ann Arbor, Center for IT Integration, Aug. 1991, pp. 1-6.

Nellas, V. et al., "Internet Provision Over ATM Infrastructure to Residential Users. A DAVIC Compliant Approach," Network and Optical Communications 96 (NOC'96) vol. II, Jun. 1996, pp. 199-205.

Network Working Group. Multicast Extensions to OSPF, Request for Comments: 1584 [online], [retrieved on Jun. 22, 2001]. Retrieved from the Internet <URL: 90 pages.

Nussbaumer, J.P. et al., "Networking Requirements for Interactive Video on Demand," IEEE Journal on Selected Areas in Communications, vol. 13(5), pp. 1-23, 1995.

O'Callaghan, Daniel, "A Central Caching Proxy Server for WWW Users at the University of Melbourne," First Australian World-wide Web Conference, University of Melbourne, Australia, 1995, pp. 1-8.

Obraczka, K., "Massively Replicating Services in Wide-Area Internetworks," Ph.D. Dissertation, University of Southern California, Dec. 1994, pp. i-xv and 1-123.

Papadimitriou, C. et al., "Information Caching for Delivery of Personalized Video Programs on Home Entertainment Channels," Proceedings of the International Conference on Multimedia Computing and Systems, Boston, MA, May 14-19, 1994, pp. 214-223.

Parmelee, J. [jparmele@csfbg.csfb.com:] "The Last Mile: Cable Modems vs. ISDN," Jan. 3, 1996, pp. 1-4.

Pasquale, J. et al., "The Multimedia Multicast Channel," Proceedings of 3rd International Workshop on Network and Operating System Support for Digital Audio and Video, San Diego, CA, Nov. 1992, pp. 1-11.

Pullen J. et al., "Dual-Mode Multicast for DIS," 12th Workshop on Standards for the Interoperability of Distributed Simulations, paper 12-95-087, Mar. 1995, 7 pages.

Rebane, G. J., "A Class of Hierarchical Store/Forward Interactive Television Systems With an Approach to the Development of Their Analytical Performance Models," SPIE, vol. 2615, Jun. 1996, 18 pages.

Rhodes, L. "The Race for More Bandwidth," Wired Magazine, Issue 4.01, Jan. 1996, pp. 1-8.

Rowe, L.A. et al., "A distributed hierarchical video-on-demand system," icip, p. 334, 1995 International Conference on Image Processing (ICIP'95)—vol. 1, 1995.

Sala, D. et al., "A Protocol for Efficient Transfer of Data Over Fiber/Cable Systems," GIT-CC-95/18, Jun. 1995, Presented at IEEE INFOCOM'96, The Conference on Computer Communications, Mar. 1996, pp. 1-14.

Sharpe, Randy et al., "Taking ATM Home," Telecommunications International, Dec. 1995, 4 pages.

Sharpe, et al., "Taking ATM Home," Telephony, Aug. 21, 1995, pp. 38-42.

Sincoskie, W.D., "System Architecture for a Large Scale Video on Demand Service," Computer Networks and ISDN Systems 22, North-Holland, Nov. 26, 1991, pp. 155-162.

Sincoskie, W.D., "Video on Demand: Is It Feasible?" IEEE Global Telecommunications Conference, Dec. 2-5, 1990, pp. 305.3.1-305.3.5.

Smith, N., "What Can Archives Offer the World Wide Web?" University of Kent at Canterbury, Mar. 22, 1994, Presented at the First International World Wide Web Conference, Geneva (Switzerland), May 1994, pp. 1-12.

United States Office Action, U.S. Appl. No. 12/901,194, filed Jan. 5, 2011, 7 pages.

Viswanathan, S. et al., "Pyramid Broadcasting for Video on Demand Service," Proc. the SPIE Multimedia Computing and Networking Conference, San Jose, CA, 1995, pp. 1-25.

Wessels, "Intelligent Caching for World-Wide Web Objects," Master's Thesis, University of Colorado, 1995, pp. 1-85.

Woo, H. et al., "A New VOD Service Scheme With Dynamic Multicasting Capabilities," International Conference on Distributed Multimedia Systems and Application, IASTED/ISMM, Aug. 1994, pp. 37-40.

Woo, H. et al., "Multicast Scheduling for VOD Services," Multimedia Tools and Applications, 2, 157-171, 1996 Kiuwer Academic Publishers, Boston. Manufactured in The Netherlands, 1996, pp. 156-171.

The World Wide Web Consortium, List of papers prepared for the workshop "Television and the Web", Jun. 28-30, 1998, Sophia-Antipolis, France.

Worrell, K.J., "Invalidation in Large Scale Network Object Caches," Master's Thesis, University of Colorado, Boulder, 1994, pp. i-vii and 1-49.

\* cited by examiner

| ASN | NEXT HOP | UPSTREAM LABEL |
|---|---|---|
| X | 10.4.4.4 | LABEL_1 |

| ASN | NEXT HOP | DOWNSTREAM LABEL | UPSTREAM LABEL |
|---|---|---|---|
| X | 10.1.0.1 | LABEL_1 | LABEL_3 |
| Y | 10.0.0.1 | LABEL_2 | LABEL_4 |

| ASN | NEXT HOP | DOWNSTREAM LABEL |
|---|---|---|
| X | 10.1.1.1 | LABEL_3 |
| Y | 10.1.1.1 | LABEL_4 |

SHARING IP NETWORK RESOURCES

CROSS-REFERENCE TO RELATED APPLICATION

This application is a divisional of U.S. patent application Ser. No. 09/645,011, filed on Aug. 23, 2000, entitled SHARING IP RESOURCES by Jeremy T. Johnson, et al., the contents of which are herein incorporated by reference in its entirety.

BACKGROUND

1. Field of the Invention

This invention pertains in general to computer networks and in particular to a broadband network for coupling end-users to Internet service providers.

2. Background Art

In recent years, there has been substantial growth in broadband Internet access. In the traditional sense, "broadband" refers to a transmission medium capable of supporting a wide range of frequencies. In more common parlance, however, "broadband" refers to a transmission medium capable of supporting a high data transfer rate. An example of a broadband network is a cable modem network.

In a broadband network, the network infrastructure closest to the end-user is referred to as the "customer access network." The customer access network for a cable modem network is the cable that runs from a cable modem termination server (CMTS) in a cable television headend to the end-user and the radio frequency (RF) plant for driving the signals carried on the cable. Usually, multiple end-users share the bandwidth available on a single cable.

A customer access network is typically aggregated with other customer access networks and linked to a high-speed network backbone. The backbone, in turn, is linked to the Internet. Typically, the customer access network and backbone are owned and/or operated by a single entity, or by two entities operating under a joint agreement. For example, a cable network is typically owned by a single cable company called a Multiple Systems Operator (MSO) and the backbone is managed by a partner of the MSO.

While there are relatively few entities that own the broadband network infrastructure, there are many Internet service providers (ISPs) that desire to provide Internet access to the end-users. However, the entities that own the broadband network infrastructure have been reluctant to share network access with other ISPs due, in part, to the difficulty in sharing the bandwidth on the cable network. Bandwidth on the customer access network, while broadband, is not unlimited, and heavy use by the end-users of one ISP can impact the bandwidth available to the users of other ISPs. In one attempted solution to this problem, each ISP is allocated a 1.5 MHz upstream slice and a 6 MHz downstream slice of the available frequency spectrum. These slices are referred to as "channels." In this solution, traffic for one ISP would not interfere with traffic for another ISP. However, the upstream frequency spectrum on a cable network available to cable modems is limited to frequencies below 80 MHz. Since this is a noisy part of the spectrum, there are usually only about six to 18 upstream channels available on the cable. It is inefficient and impractical to allocate channels to particular ISPs since ISPs with many end-users would require more bandwidth than is available in a channel while the channels of ISPs having few end-users would be underutilized.

Accordingly, the entities that own and/or operate the network infrastructure often require the end-user to use a single ISP. That ISP, in turn, is usually associated with the entity or entities that own and/or operate the network. Thus, an end-user with a cable modem typically uses an ISP affiliated with the MSO. If the end-user desires to use a different ISP, the end-user often must use a narrowband connection, such as an analog modem using a plain old telephone service (POTS) line, to connect to the ISP.

Since multiple ISPs desire access to the broadband network infrastructure, there is a need in the art for a way for the ISPs to efficiently share the available bandwidth on the customer access network and broadband network. A solution to this need should allow an end-user on a broadband customer access network to select from among multiple ISPs and should allow accounting for the bandwidth utilized by the customers of each ISP.

DISCLOSURE OF THE INVENTION

The above needs are met by method and system using multiprotocol label switching (MPLS) to source route Internet protocol (IP) packets from an end-user to the ISP associated with that end-user. A plurality of end-users are coupled to a customer access network, such as a cable modem network or a digital subscriber line (DSL) network. Each end-user is associated with a particular Internet service provider (ISP). A reference to the ISP, preferably the autonomous system number (ASN) of the ISP, is soft- or hard-coded at the end-user.

The end-users are connected to a broadband customer access network, such as a cable television or telephone network. An aggregation router, such as a cable modem termination server or a DSL access multiplexer, aggregates the data packets received from the end-users. Each end-user informs the aggregation router of the ASN of the ISP associated with that end-user. The aggregation router transmits the aggregated data packets over a network backbone to a border router. The border router couples one or more ISPs to the network backbone.

The border router is configured to sense the ASNs and IP addresses of the ISPs coupled to it upon activation. The border router creates a forwarding equivalency class (FEC) for each coupled ISP. The border router binds a label to each FEC and stores the label, the ASN of the ISP, and the IP address of the ISP in an FEC table. The border router advertises the label binding (the label and the FEC) to all of its upstream nodes.

When an upstream node, such as an intermediate node between the aggregation router and the border router, receives the advertisement, the node adds the advertised label binding to its local FEC table along with the IP address of the next hop for the FEC. The node also creates a new label for the FEC called the "upstream label" and stores it in the FEC table. The node creates a new label binding for the FEC using the upstream label and advertises this label binding to its upstream nodes. This binding and advertising process repeats until the aggregation router receives the label bindings for all FECs reachable from the aggregation router.

When the aggregation router receives an IP data packet from an end-user, the aggregation router determines the ASN of the ISP associated with that end-user. The ASN number is used as an index into the FEC table held at the aggregation router and the corresponding label is pushed onto the packet. Then, the aggregation router routes the packet to the next hop specified for that FEC by the FEC table.

When an intermediate node receives the forwarded packet, the node pops off the label for the packet and uses the label as an index into its local FEC table. The intermediate node retrieves the corresponding downstream node from the table and pushes it onto the packet. Then, the intermediate node forwards the packet to the next hop specified in the FEC table.

When the border router receives a packet, it pops off the label and forwards the unlabeled packet to the appropriate ISP. If desired, traffic accounting can be performed by counting the packets forwarded to the ISP by the border router. Accordingly, the present invention allows multiple ISPs to efficiently share the customer access and backbone networks.

DETAILED DESCRIPTION OF THE PREFERRED EMBODIMENTS

Figure 1:
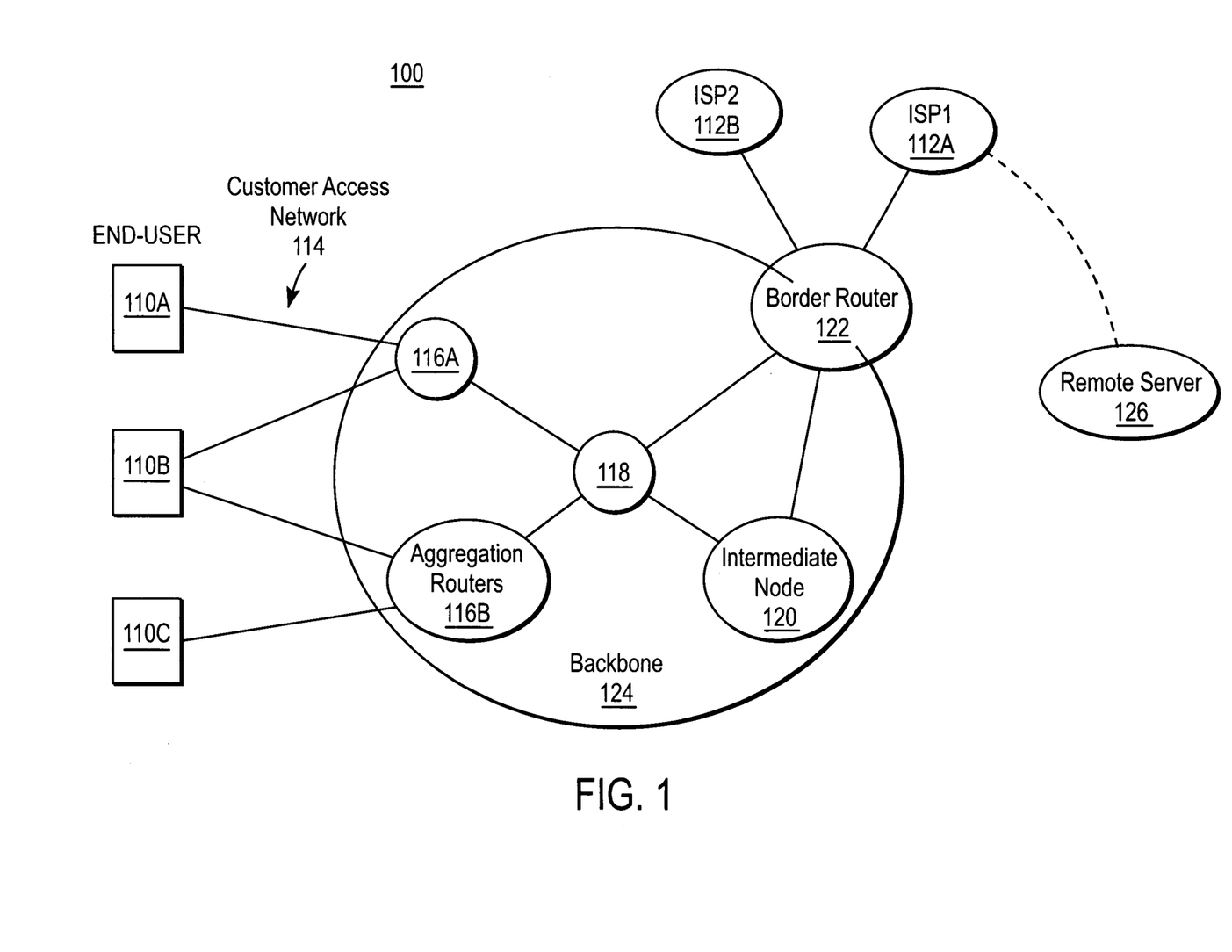
FIG. 1 is a block diagram illustrating a high-level view of network infrastructure according to an embodiment of the present invention.

FIG. 1 is a block diagram illustrating a high-level view of a network infrastructure 100 according to an embodiment of the present invention. FIG. 1 illustrates three end-users 110A, 110B, 110C connected to the network. As used herein, the term "end-user" can refer to a person using a computer system to connect to the network, the computer system itself, or a network access device, such as a modem, connecting the computer system to the network. In a typical use, a person will direct the computer system to send data out to a network and the computer will utilize the network access device to send the data. Data from an end-user 110 typically consists of Internet protocol (IP) data packets.

In one embodiment of the present invention, the network access device is either a cable modem or a digital subscriber line (DSL) modem. However, the present invention supports any form of network access device providing the functionality described herein. In a preferred embodiment of the present invention, the end-user 110 is associated with one Internet service provider (ISP) selected from among multiple ISPs, of which ISPs 112A and 112B are exemplary. In one embodiment of the present invention, a reference to the ISP 112 is soft- or hard-coded into the network access device. For example, the ISP reference can be encoded into the network access device during manufacture, selected by a person using software, jumpers, or switches, or encoded via an automated process when the access device is activated on the network. In an alternative embodiment, an end-user 110 can be associated with more than one ISP 112, although it is anticipated that the end-user will use only one ISP for an Internet session.

An end-user preferably 110 is connected via a broadband customer access network 114 to one or more aggregation routers 116A, 116B. Typically, each end-user 110 is coupled to one aggregation router 116, although embodiments where the end-user is coupled to multiple aggregation routers are also possible. In the embodiment where the end-user 110 is a cable modem, the customer access network 114 is preferably a cable television distribution network shared by multiple geographically proximate cable modem users. In such an embodiment, the aggregation router 116 is preferably a cable modem termination server (CMTS) located within the headend of the cable network. The CMTS aggregates the signals from the multiple end-users served by the headend. In the embodiment where the end-user 110 is a DSL modem, the customer access network 114 is preferably a telephone network. In such an embodiment, the aggregation router 116 is preferably a DSL access multiplexer (DSLAM) or a subscriber management system (SMS). The aggregation router 116 aggregates the signals from DSL users served by the central office in which the DSLAM or SMS is located.

Depending upon the embodiment of the present invention, either the end-user 110 or the aggregation router 116 is a "headend device." The headend device is preferably connected to the next hop (i.e., the aggregation router 116 or an intermediate node 118, depending upon which entity is the headend device) by a direct physical or logical connection. However, the headend device can be connected by any other connection type as long as the connection type does not include an active routing device. For example, the head-end device may be a bridge that merely translates and forwards packets.

If the aggregation router 116 is the headend device, the end-user 110 preferably informs the headend device of the ISP 112 associated with the end-user. This procedure preferably happens automatically. For example, if the end-user 110 is a cable modem and the headend device is an aggregation router 116 in a CMTS, the cable modem preferably uses the Data Over Cable Service Interface Specification (DOCSIS) to provide the aggregation router with the reference to the ISP 112 associated with the end-user 110. In this example, the reference to the ISP is preferably set via a new type, length, value (TLV) configuration parameter.

If, in contrast, the end-user 110 is a DSL modem and the headend device is a DSLAM, the headend device can derive the identity of the end-user 110 from the physical port, copper pair, asynchronous transfer mode (ATM) virtual circuit, or other incoming data interface to which the end-user is coupled. With this knowledge, the headend device can easily look up the ISP associated with the end-user 100. Thus, the headend device knows the ISP 112 associated with each end-user 110.

One or more intermediate nodes are connected to the aggregation routers 116A, 116B. In FIG. 1, the aggregation routers 116A, 116B are connected to a first intermediate node 118 which, in turn, is coupled to a second intermediate node 120. The first and second intermediate nodes 118, 120 are connected to a border router 122. As with the headend device, an intermediate node 118, 120 is preferably connected to the next hop (i.e., another intermediate node or a border router) with a direct physical or logical connection.

Although only one border router 122 is shown in FIG. 1, embodiments of the present invention can have any number of border routers connected to the headend or any intermediate node. The border router 122 is connected to one or more other networks (i.e., ISPs). In FIG. 1, the illustrated border router 122 is connected to the networks of first 112A and second 112B ISPs. The border router 122 is preferably connected to the ISPs 112 via either a direct physical connection, such as a telephone company circuit, a fast Ethernet connection, an asynchronous transfer mode (ATM) connection, or a fiber distributed data interface (FDDI) connection, or a logical connection, such as an IP tunneling connection. Furthermore, the ISP 112 should not be more than one hop away from the border router 122.

The aggregation routers 116, intermediate nodes 122, and border router 122 form a network backbone 124. The present invention allows data from the end-users 110 to reach associated ISPs 112 through the customer access network 114 and backbone 124. The backbone 124 preferably provides extremely high bandwidth in order to support many end-users 110 and ISPs. The present invention allows the bandwidth on the customer access network 114 and network backbone 124 to be efficiently shared among the end-users 110 of multiple ISPs 112.

The term "ISP" is used herein to refer to any network or server receiving data packets from an end-user via the customer access network 114 and backbone 124. Although the term "ISP" is used above to describe a network that provides Internet access to an end-user 110, an ISP can provide any network-based service. An ISP can, for example, merely be an intermediate network that transports end-user 110 data to another network on the Internet or elsewhere. What the ISP does with the data packets is not material to the present invention.

Embodiments of the present invention can have many different ISPs connected to the backbone 124 via border routers. Exemplary ISPs include @Home, Sprint, MCI, America Online, Microsoft Network, Mindspring, and Earthlink. It should be recognized, however, that there are thousands of different ISPs. Multiple ISPs can be connected to a single border router 122 or each ISP can have a dedicated border router. Likewise, a single ISP 112 can be coupled to multiple border routers on the network backbone 124 in order to provide redundancy. Preferable, the ISP is identified by an autonomous system number (ASN) assigned to the ISP by an organization devoted to that purpose. In the United States, ASNs are assigned by the American Registry for Internet Numbers (ARIN). The ASN is a value that uniquely identifies the network of the ISP 112. In one embodiment of the present invention, the "reference to the ISP" stored by the end-user 110 is the ASN of the ISP.

Typically, the ISP 112 is connected via the Internet to a remote server 126. The remote server 126 can provide any Internet-based service. For example, the remote server 126 might be a web server managed by EXCITE@HOME, EBAY, or YAHOO.

A preferred embodiment of the present invention uses multiprotocol label switching (MPLS) to route IP data packets from the end-user 110 to the appropriate ISP 112. MPLS routes IP data packets from one router to the next, such as from intermediate node 118 to intermediate node 120, using an independent forwarding decision for each packet. Each router independently chooses a next hop for a packet. Choosing the next hop can be thought of as the composition of two functions. The first function partitions the entire set of possible packets into a set of forwarding equivalence classes ("FECs"). The second function maps each FEC to a next hop. All packets which belong to a particular FEC and which travel from a particular node will follow one of a set of paths associated with the FEC.

In MPLS, the assignment of a particular packet to a particular FEC is performed only once, as the packet enters the network. The FEC to which the packet is assigned is encoded with a label. The label is preferably a short, four-byte value called a "shim header." Packets are labeled at each router before the packets are forwarded by adding the shim header to an otherwise unaltered IP packet. At subsequent hops, the label is used as an index into a table which specifies the next hop, the outgoing network interface, and a new label. The old label is replaced with the new label, and the packet is forwarded through the specified network interface to the next hop. The path followed by the packet through the network is called the "label switched path" (LSP).

Additional details on MPLS can be found in Rosen, Viswanathan, Callon, "Multiprotocol Label Switching Architecture," August 1999, available at http://www.ietf.org/ietf/draft-ietf-mpls-arch-06.txt, and Callon, Doolan, Feldman, Fredette, Swallow, Viswanathan, "A Framework for Multiprotocol Label Switching," September 1999, available at http://www.ietf.org/ietf/draft-ietf-mpls-framework-05.txt, and Andersson, Doolan, Feldman, Fredette, Thomas, "LDP Specification," October 1999, available at http://www.ietf.org/ietf/draft-ietf-mpls-ldp-06.txt, all of which are hereby incorporated by reference herein. In general, these references describe MPLS over layers one and two of the Open Systems Interconnection (OSI) reference model. A preferred embodiment of the present invention, in contrast, utilizes MPLS over layer three of the OSI model, the Network layer.

Figure 2:
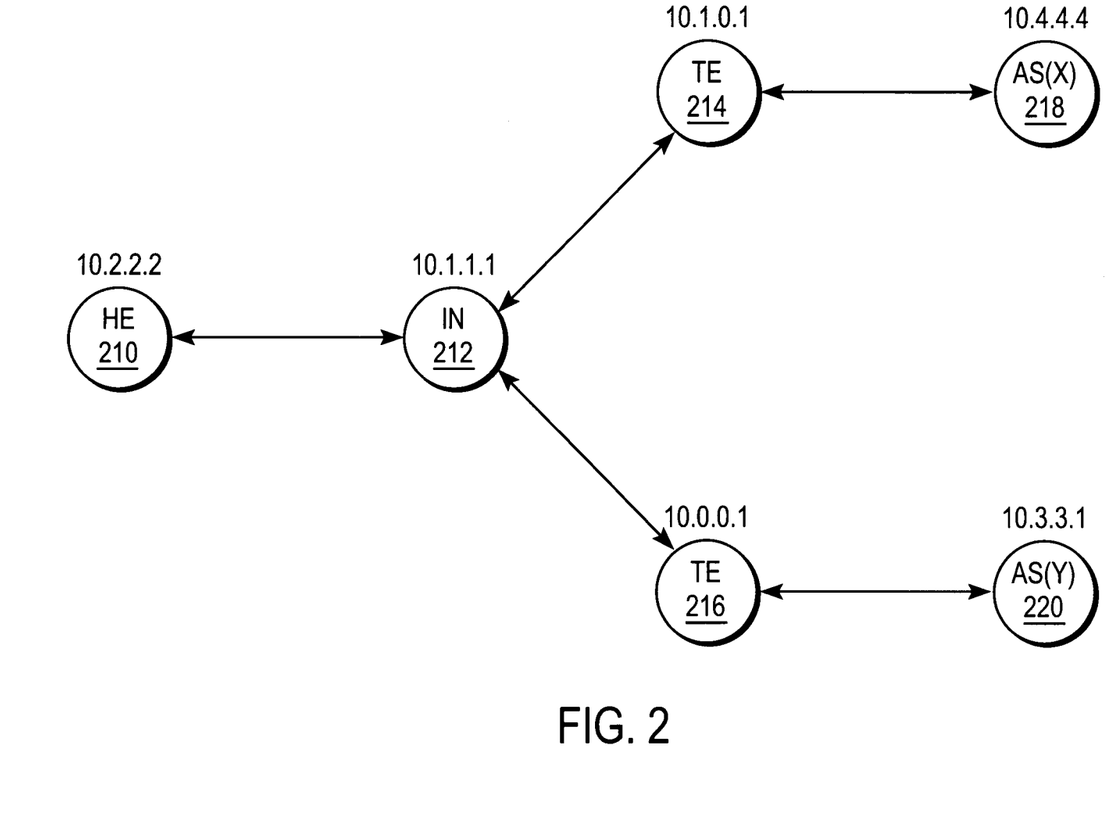
FIG. 2 is a block diagram illustrating a view of the customer access and backbone networks according to an embodiment of the present invention.

FIG. 2 is a block diagram illustrating several LSPs 200 within the customer access network 114 and backbone 124 according to an embodiment of the present invention. FIG. 2 illustrates a single headend 210. As described above, the headend 210 is typically either the end-user 110 or the aggregation router 116, depending upon the embodiment of the present invention. The headend 210 pushes the initial labels onto the data packets. An intermediate node 214 is located between the headend 210 and the tailends 214, 216. The tailends 214, 216 pop the final labels off the packets. In a preferred embodiment of the present invention, the tailends 214, 216 are border routers of the backbone 124. The two illustrated tailends 214, 216 are respectively coupled to first and second ISPs 218, 220. The ISPs are 218, 220 are autonomous from the backbone 124. The first ISP 218 has an ASN of X, designated as ASN(X), and the second ISP 220 has an ASN of Y, designated as ASN(Y). In FIG. 2, the direction from the headend 210 to the tailend 214, 216 is referred to as the "downstream" direction while the direction from the tailend 214, 216 to the headend 210 is referred to as the "upstream" direction.

Figure 3:
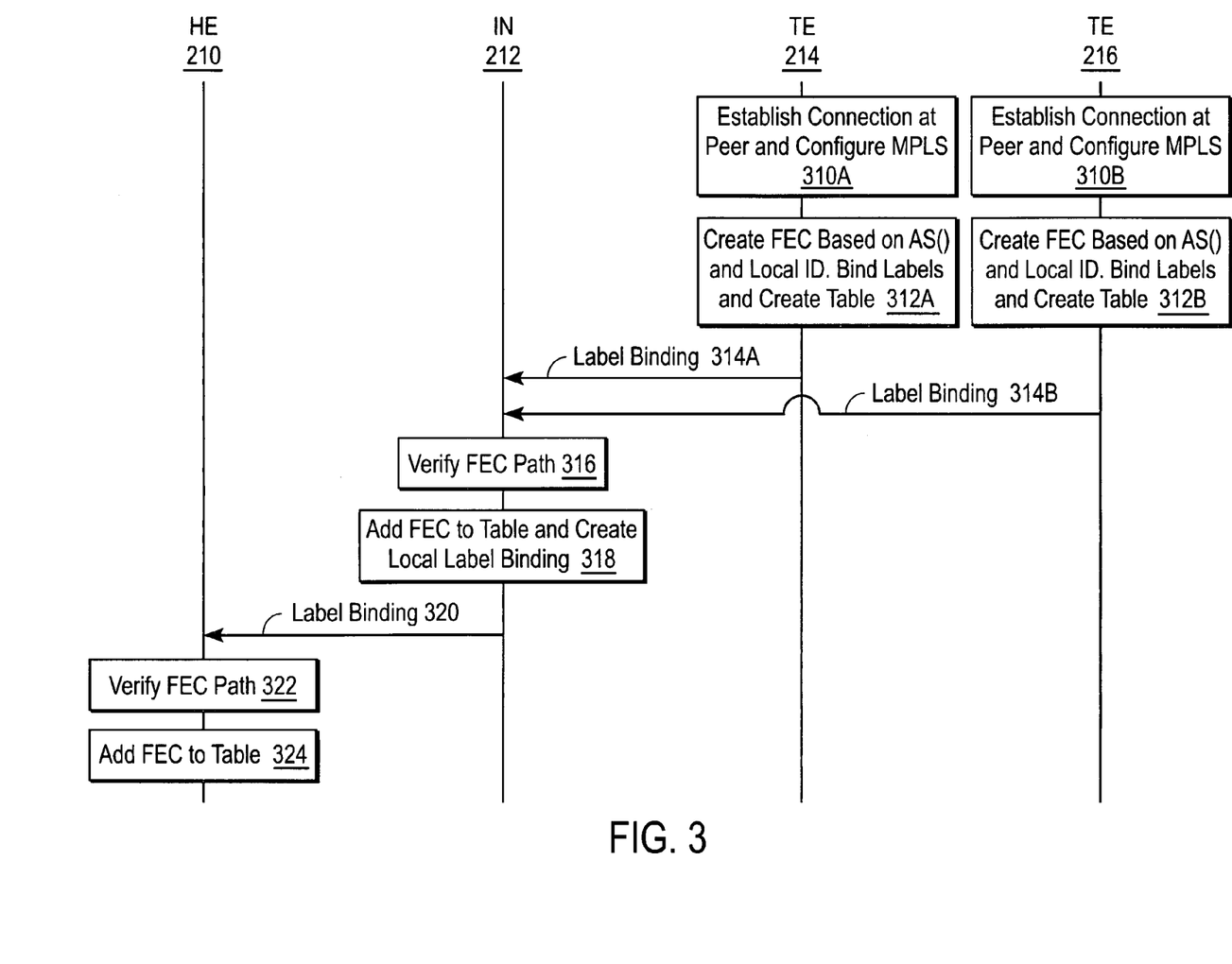
FIG. 3 is a flow diagram illustrating steps performed and communications made by the entities illustrated in FIG. 2 when establishing label switched paths (LSPs) according to an embodiment of the present invention.

FIG. 3 is a flow diagram illustrating steps performed and communications made by the entities illustrated in FIG. 2 when establishing LSPs using a label distribution protocol according to an embodiment of the present invention. Alternative embodiments of the present invention can use different label distribution protocols and/or data encapsulation methods. FIG. 3 lists the headend 210, intermediate node 212, and two tailends 214, 216 along the top of the figure. Actions performed by the entities are in boxes below the entities and communications between the entities are represented by horizontal arrows. For purposes of example, assume that the headend 210 has an internet protocol (IP) address of 10.2.2.2, the intermediate node 212 has an IP address of 10.1.1.1, the first border router 214 has an IP address of 10.1.0.1, the second border router 216 has an IP address of 10.0.0.1, the first ISP 218 has an IP address of 10.4.4.4, and the second ISP 220 has an IP address of 10.3.3.1.

When the tailends 214, 216 (i.e., the border routers) are initially activated, the tailends establish 310 connections with their respective peer ISPs and determine the actual outgoing interfaces that transmit data to the peers. Thus, tailend 214 determines that its peer is the ISP 218 having ASN(X) and IP address 10.4.4.4, and determines the specific outbound interface that it will use to transmit data to the ISP 218. Tailend 216 performs the same function with respect to ISP 220. Then, each tailend 214, 216 creates 312 a FEC for its peer. The FEC is derived from the ASN of the peer and an IP address of the tailend 214, 216 (preferably a loopback address of the tailend router). The tailend 214, 216 also binds 312 a label to the FEC. The label is a short, preferably fixed length, locally significant identifier which is used to identify a particular FEC. In one embodiment, the label is the shim header described previously. The FEC and label, taken together, are referred to as the "label binding."

Figure 4A:
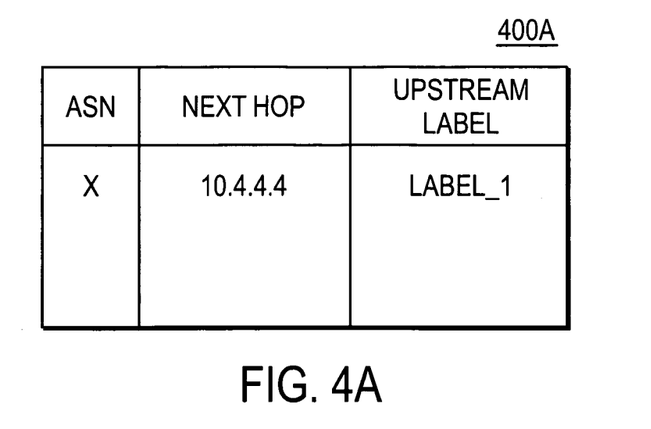
FIGS. 4A-4C illustrate exemplary forwarding equivalency class tables.

The tailend 214, 216 also preferably creates 312 an FEC table, or updates an existing table, with the FECs reachable from the tailend. FIG. 4A illustrates an exemplary table 400A for tailend 214. For each FEC, the table at the tailend 214 holds the ASN, the next hop, or address of the next server for reaching the system having the given ASN, and an upstream label corresponding to the FEC. Although not shown in FIG. 4, the FEC table also preferably holds the outbound interface for each next hop. Since tailend 214 can only reach one ISP 218 in our example, the FEC table of FIG. 4A has only one entry.

The tailend 214, 216 advertises its existence to all of its peers within the backbone 124. In a preferred embodiment of the present invention, LSP advertisements are disabled on any external (i.e., downstream) facing interfaces of the tailend 214, 216. An LSP advertisement includes the label bindings for the autonomous systems reachable through the tailend 214, 216.

The LSP advertisements are passed 314 to the upstream peer routers. In the example of FIG. 2, the intermediate node 212 is the next upstream router for both tailends 214, 216. After receiving an LSP advertisement, the intermediate node 212 verifies 316 via its routing table that a better path for the FEC does not exist and that the FEC does not create a routing loop. The intermediate node 212 also arbitrates between similar FECs and label bindings. Arbitration may be required in some embodiments because an intermediate node 212 may have several different paths available for reaching a given tailend 214, 216. In a preferred embodiment of the present invention, the LSP with the shortest distance, calculated using a routing metric independent of the routing protocol, is the active LSP for the intermediate node 212 until that LSP is no longer the shortest distance or the LSP is torn down. The intermediate node 212 also creates 318 its own label bindings based on the FECs received from the downstream nodes and stores the labels for these label bindings in its local FEC table.

Figure 4B:
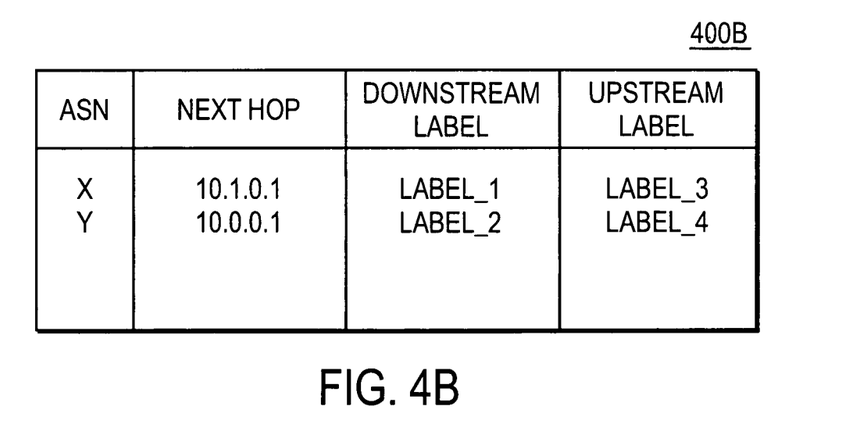

FIG. 4B illustrates an exemplary FEC table for the intermediate node 212. As with the table of FIG. 4A, this table lists ASNs and associated next hops. In the table of FIG. 4B, the next hop address for ASN(X) is the IP address of tailend 214 while the next hop address for ASN(Y) is the IP address of tailend 216. The table also has entries for downstream labels and upstream labels. The downstream labels are the labels for the label bindings received from the downstream nodes. The upstream labels, in contrast, are the labels for the label bindings created locally by the intermediate node 212.

The intermediate node 212 advertises 320 the label bindings it created 318, i.e. the label bindings having the upstream labels, to its upstream nodes. If there are multiple LSPs for a particular FEC, the intermediate node 212 preferably advertises only the label binding for the active LSP for the FEC to the upstream nodes.

Figure 4C:
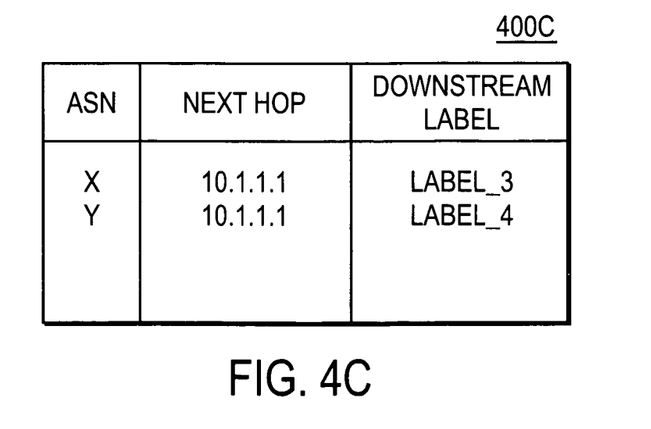

In the example of FIG. 2, the headend 210 is the only upstream node of the intermediate node 212. As with the intermediate node 212, the headend 210 uses its routing table to verify 322 and arbitrate the LSPs for the received FECs. If there are multiple paths for a FEC, the headend places 324 the best path for the FEC in its FEC table. FIG. 4C illustrates an exemplary FEC table for the headend 210. The table for the headend 210 resembles the other tables, except that the addresses for the next hops for both ASN(X) and ASN(Y) are 10.1.1.1, the address of the intermediate node 212. Also, the table for the headend 210 does not have an "upstream label" column because there are no upstream nodes in the LSP. Once all of the label bindings are passed back to the headend 210, the headend FEC table contains all FECs reachable from the headend.

Figure 5:
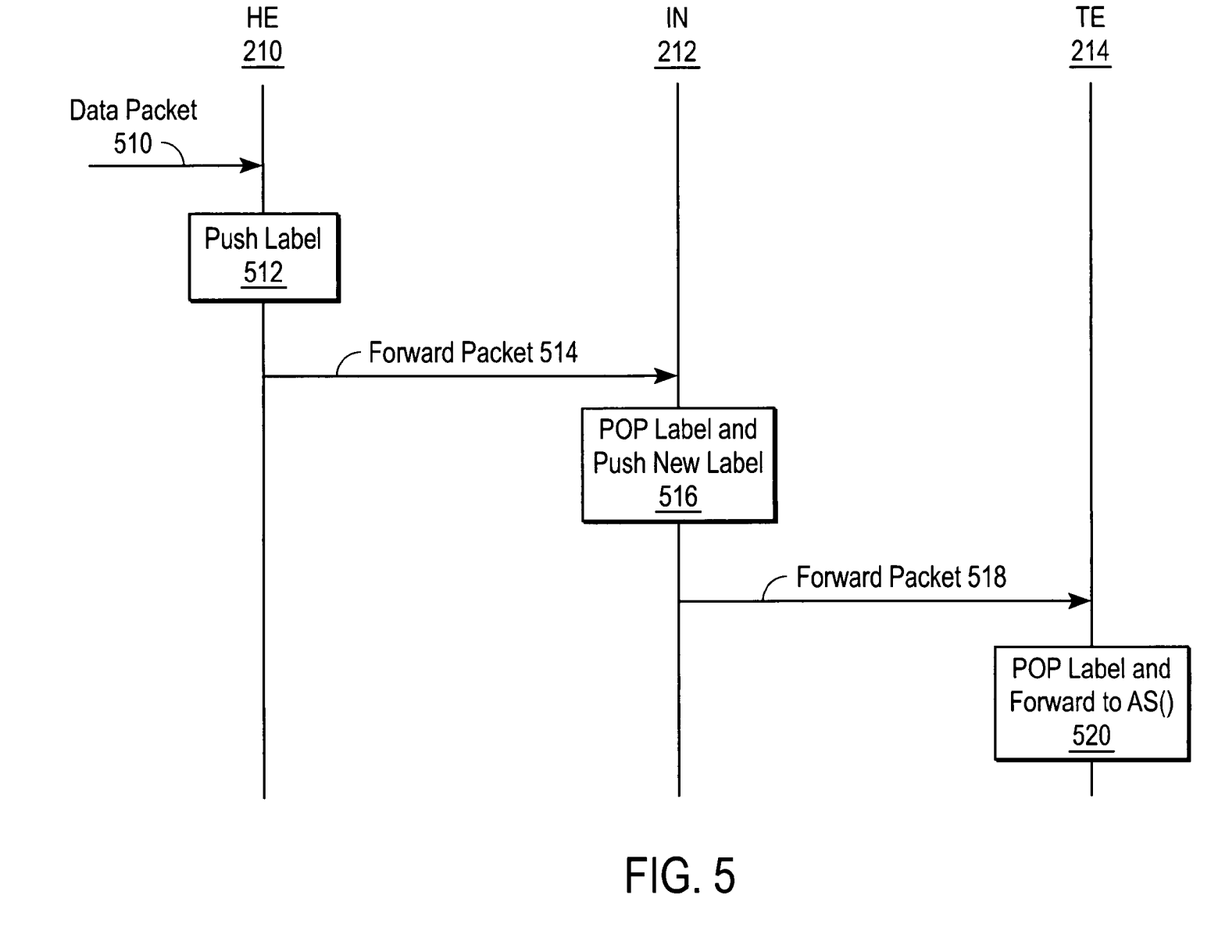
FIG. 5 is a flow diagram illustrating steps performed and communications made by the entities illustrated in FIG. 2 when forwarding data down a LSP according to an embodiment of the present invention.

FIG. 5 is a flow diagram illustrating steps performed and communications made by the entities illustrated in FIG. 2 when forwarding data down a LSP. Initially, the headend 210 receives 510 an IP data packet from an end-user 110. If the headend 210 is an end-user 110, the headend explicitly knows with which autonomous system (AS) (i.e., ISP 112) the end-user is associated. If the headend 210 is not an end-user 110, the headend 210 still knows from which end-user 110 the packet was received, the ISP associated with that end-user, and the ASN associated with that ISP.

If the headend 210 has an entry in the FEC table with the ASN for the ISP associated with the end-user 110 who sent the packet, the headend pushes 512 the corresponding downstream label onto the packet. For example, if the end-user is associated with ISP 218 having ASN(X), the headend 210 will push label "label_3" onto the packet. "Label_3" is the downstream label for the FEC specifying the ISP having ASN(X) in the example of FIGS. 2-4. The headend 210 forwards 514 the packet with the label to the corresponding "next hop" address in the FEC table 400C. In this example, the next hop is to the intermediate node 212. This technique routes the packet based on the source of the packet rather than the destination specified by the packet itself and is known as "source-based routing," or simply "source routing."

If the headend 210 has multiple entries in the FEC table 400C for reaching the ISP having the given ASN, the headend preferably uses a path-choosing metric to choose the appropriate LSP for the packet. One embodiment of the present invention stores path weights in the FEC table, where a path weight indicates the cost of taking the given next hop. Another embodiment of the present invention uses a tie-breaking mechanism, such as choosing the next hop with the lowest IP address, to choose between two potential LSPs. If the headend 210 does not have an entry in the FEC table for the AS associated with the source of the packet, one embodiment of the present invention ignores the data packet. Other embodiments of the present invention may perform different actions if there is no FEC table entry for the AS associated with the source of the packet.

Upon receiving the packet, the intermediate node 212 pops 516 the label off the packet and uses the popped label as an index into the "upstream label" column of its FEC table 400B. The intermediate node 212 then pushes 516 the downstream label from the corresponding table entry onto the packet. This process is referred to as "label swapping." In this example, the downstream label is "label_1." Next, the intermediate node 212 forwards the packet 518 to the "next hop" address in the corresponding table entry, which in this example is the address of tailend 214.

When the tailend 214 receives the packet, the tailend pops the label off the packet and uses the popped label as an index into the "upstream label" column of its FEC table 400A. Since the tailend 214 is the last node in the LSP, the tailend does not push another label onto the packet. Instead, the tailend 214 forwards 520 the unlabelled packet to the "next hop" address corresponding to the popped label. The next hop, by definition, is to the ISP associated with the end-user 110. Accordingly, IP data packets sent from the end-users 110 are delivered to the respective ISPs associated with the end-users. Since packets received by the ISP are unlabelled, the ISP treat the packet as a standard IP packet and can use destination-based forwarding or any other means that the ISP desires to deliver the packet to its final destination.

When a connection between routers is closed, or a router becomes inoperative, a LSP can be "torn down" by passing messages in the upstream direction. For example, if the border router forming tailend 216 loses its connection with the ISP 220 having ASN(Y), the border router 216 sends messages to its upstream nodes indicating that the label binding for ASN(Y) has become invalid. An upstream node, upon receiving the message, preferably deletes the corresponding entry from its FEC table. The upstream node then preferably passes the message to its upstream nodes using its upstream label bindings. In the end, the entire LSP is removed. As a result, traffic is dynamically rerouted around broken LSPs.

The present invention allows multiple ISPs 112 to be independently connected to the backbone 124 regardless of the network topology. In addition, each ISP 112 can peer with the backbone 124 at one or more different border routers 122. For example, an ISP 112 may wish to peer with the backbone 124 at multiple locations to provide redundancy and fault tolerance. When the border router 122 peering with the ISP 112 is activated, the border router 122 becomes the tailend of a LSP leading to the ISP. Since the headend of the LSP has knowledge of all of the LSPs available on the backbone 124, the headend can select the best path to reach a particular ISP. Traffic is dynamically rerouted in the case that a path fails due to, for example, a system failure or administrative activity.

It is desirable to account for the bandwidth on the customer access network 114 and backbone 124 utilized by each ISP 112. According to a preferred embodiment of the present invention, accounting is performed by monitoring the packets passing out of the backbone at each border router 122. Alternatively, if the border router 122 is only coupled to a single ISP 112, the packets flowing into the border router can be counted. The aggregation routers 116B and intermediate nodes 118 do not need to count packets, which makes internal routing more efficient.

This accounting allows ISPs 112 to enter into usage agreements with the entity managing the customer access network 114 and/or backbone 124. For example, a certain ISP can agree that its end-users will utilize up to a determined maximum amount of bandwidth. Alternatively, an ISP can agree to pay a fee based on the amount of bandwidth actually utilized by the end-users associated with that ISP. Under the present invention, the total downstream bandwidth available on the customer access network 114 and backbone 124 is utilized and shared efficiently, without any of the problems or inefficiencies inherent in alternative bandwidth-sharing solutions.

Another advantage of the present invention is that the source-based routing allows traffic policies to be enforced. In one embodiment of the present invention, the aggregation routers 116 can be configured to ignore or place a lower priority on IP packets received from end-users 110 associated with a particular ISP. For example, if an ISP has exceeded its bandwidth allocation, traffic from end-users of that ISP can be reduced or terminated by configuring the aggregation routers 116 to not forward packets from those end-users. Likewise, the traffic can be stopped at the border routers 122, although stopping the traffic at the aggregation routers 116 is preferred because the packets do not enter the backbone 124. Return traffic, from the ISP 112 to the end-user 110, can be handled independently of the technique described above.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A system for sharing bandwidth among a plurality of internet service providers (ISPs) coupled to a backbone network, the system comprising:
   a broadband customer access network for coupling a plurality of end-users to the backbone network, wherein each end-user is associated with a particular one of the plurality of ISPs;
   a first router coupled to the customer access network and in communication with the backbone network for source-routing data packets output by at least one end-user to the ISP associated with the at least one end-user, wherein the first router is configured to:
      receive a reference to the ISP from the at least one end-user via a Data Over Cable Service Interface Specification (DOCSIS) configuration parameter; and
      determine the ISP associated with the at least one end-user from the reference to the ISP received from the end-user via the DOCSIS configuration parameter; and
   a second router coupled to the backbone network and at least one of the plurality of ISPs for receiving the data packets source-routed by the first router and passing the data packets to the ISP associated with the at least one end user.

2. The system of claim 1, wherein the first router is an aggregation router coupled to the customer access network and the backbone network, the aggregation router for aggregating data packets received from a plurality of end-user systems on the customer access network onto the backbone network.

3. The system of claim 1, wherein the first router is the headend of a label switched path and the second router is the tailend of the label switched path.

4. The system of claim 3, wherein the first router pushes a label onto each data packet received from the at least one end-user and the second router pops a label off each data packet, further comprising:
   at least one intermediate node coupled to the network between the first and second routers, the at least one intermediate node for receiving a data packet from the first router, performing a label swap on the packet, and routing the data packet towards the second router.

5. The system of claim 1, wherein the broadband customer access network is a cable television network.

6. The system of claim 1, wherein the configuration parameter comprises a type, length, value configuration parameter.

7. The system of claim 1, wherein the end-user comprises a cable modem.

8. A system for sharing bandwidth on a customer access network, to which a plurality of end-users are coupled, among a plurality of internet service providers (ISPs), wherein each end-user is associated with a particular ISP, the system comprising:
   a first node coupled to the customer access network and to a backbone network, the first node for receiving data packets from the plurality of end-users, for determining the ISP associated with each end-user, and for routing the data packets from each end-user to the ISP associated with the end-user, wherein the first node is configured to:
      receive a reference to the ISP from the end-user via a Data Over Cable Service Interface Specification (DOCSIS) configuration parameter; and determine an ISP associated with an end-user from the reference to the ISP received from the end-user via the DOCSIS configuration parameter; and a second node coupled to the backbone network and to one or more of the ISPs, for receiving the data packets routed by the first node to the one or more ISPs coupled to the second node, and for passing the data packets to the associated ISPs.

9. The system of claim 8, wherein the first node is an aggregation router for aggregating the data packets from the end-users onto the backbone network.

10. The system of claim 8, wherein the first node uses multiprotocol label switching (MPLS) to route data packets to the ISP associated with the end-user.

11. The system of claim 10, wherein the first node uses MPLS over the Network layer of the Open Systems Interconnection network reference model.

12. The system of claim 10, wherein the first node associates a label with a data packet, wherein the label is determined responsive to the end-user providing the packet.

13. The system of claim 8, wherein the reference to the ISP comprises an autonomous system number (ASN).

14. A method for sharing bandwidth among a plurality of internet service providers (ISPs) coupled to a backbone network, the method comprising:

coupling a plurality of end-users to a router of the backbone network, wherein each end-user user is associated with a particular one of the plurality of ISPs;

receiving a reference to the ISP from an end-user via a Data Over Cable Service Interface Specification (DOCSIS) configuration parameter;

determining an ISP associated with the end-user from the reference to the ISP received by the router from the end-user via the DOCSIS configuration parameter;

source-routing data packets output by the end-user to the ISP associated with the end-user; and passing the source routed data packets to the ISP associated with the end user.

15. The method of claim 14, wherein source-routing data packets output comprises:

aggregating data packets received from a plurality of end-user systems on a customer access network onto the backbone network.

16. The method of claim 15, wherein source-routing data packet comprises:

using multiprotocol label switching (MPLS) to route data packets to the ISP associated with the end-user.

17. A method for sharing bandwidth on a customer access network, to which a plurality of end-users are coupled, among a plurality of internet service providers (ISPs), wherein each end-user is associated with a particular ISP, the method comprising:

receiving data packets from the plurality of end-users;

receiving a reference to the ISP from each end-user via a Data Over Cable Service Interface Specification (DOCSIS) configuration parameter;

determining the ISP associated with each end-user from a reference to the ISP received from the end-user via the DOCSIS configuration parameter;

routing the data packets from each end-user to the ISP associated with the end-user; and passing the data packets to the ISP associated with each end-user.

18. The method of claim 17, wherein routing data packets comprises:

aggregating the data packets from the end-users onto a backbone network.

19. The method of claim 17, wherein routing data packets comprises:

using MPLS over the Network layer of the Open Systems Interconnection network reference model.

20. The method of claim 17, further comprising:

responsive to identifying a failure in a first path used for routing data packets from a first end-user to a first ISP, routing the data packets via a second path.

21. The method of claim 17, further comprising:

responsive to identifying a first ISP exceeding its bandwidth allocation, reducing traffic from end-users associated with the first ISP.

* * * * *

UNITED STATES PATENT AND TRADEMARK OFFICE
CERTIFICATE OF CORRECTION

PATENT NO. : 8,463,920 B2
APPLICATION NO. : 11/261809
DATED : June 11, 2013
INVENTOR(S) : Jeremy T. Johnson et al.

Page 1 of 1

It is certified that error appears in the above-identified patent and that said Letters Patent is hereby corrected as shown below:

In the Claims

Column 11, line 27, after "end-user" and before "is" delete "user".

Signed and Sealed this
First Day of April, 2014

Michelle K. Lee
*Deputy Director of the United States Patent and Trademark Office*